United States Patent
Wu (10) Patent No.: US 9,125,174 B2
(45) Date of Patent: Sep. 1, 2015

(54) APPARATUSES AND METHODS FOR SELECTIVELY RECEIVING MULTIMEDIA BROADCAST/MULTICAST SERVICE IN A WIRELESS COMMUNICATIONS SYSTEM

(75) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 662 days.

(21) Appl. No.: 13/071,017

(22) Filed: Mar. 24, 2011

(65) Prior Publication Data
US 2011/0235565 A1   Sep. 29, 2011

Related U.S. Application Data

(60) Provisional application No. 61/317,581, filed on Mar. 25, 2010.

(51) Int. Cl.
*H04H 20/71* (2008.01)
*H04W 72/00* (2009.01)

(52) U.S. Cl.
CPC ..................... *H04W 72/005* (2013.01)

(58) Field of Classification Search
USPC ........................... 370/312; 455/3.01
See application file for complete search history.

(56) References Cited

U.S. PATENT DOCUMENTS

| | | | | |
|---|---|---|---|---|
| 2008/0186976 A1* | 8/2008 | Axnas et al. | ........... | 370/395.4 |
| 2008/0261573 A1* | 10/2008 | Kuo | ........... | 455/414.2 |
| 2008/0268829 A1* | 10/2008 | Taylor et al. | ........... | 455/420 |
| 2011/0013550 A1 | 1/2011 | Wu | | |
| 2011/0235565 A1* | 9/2011 | Wu | ........... | 370/312 |

FOREIGN PATENT DOCUMENTS

| | | |
|---|---|---|
| CN | 101120611 A | 2/2008 |
| CN | 101291466 A | 10/2008 |
| CN | 101959140 A | 1/2011 |
| EP | 1 694 086 A1 | 8/2006 |
| EP | 1 983 702 A2 | 10/2008 |
| EP | 2 276 275 A1 | 1/2011 |
| WO | WO 2006/087067 A1 | 8/2006 |

OTHER PUBLICATIONS

3GPP TSG-RAN WG2 Meeting #69; San Francisco, U.S.A.; Feb. 22-26, 2010; pp. 1-17.
ETSI TS 136 331 V9.1.0 (Feb. 2010); LTE; Evolved Universal Terrestrial Radio Access (E-UTRA); Radio Resource Control (RRC); Protocol specification (3GPP TS 36.331 version 9.1.0 Release 9); pp. 1-234.

(Continued)

*Primary Examiner* — Huy D Vu
*Assistant Examiner* — Teisha D Hall
(74) *Attorney, Agent, or Firm* — Birch, Stewart, Kolasch & Birch, LLP (57) ABSTRACT

A mobile communications device with a wireless module and a controller module is provided. The wireless module performs wireless reception from a service network on a plurality of component carriers configured by the service network. The controller module selects a first component carrier from the plurality of component carriers providing the same multimedia broadcast and multicast services (MBMS) content and controls the wireless module to receive the MBMS content on the first component carrier.

11 Claims, 4 Drawing Sheets

(56) References Cited

OTHER PUBLICATIONS

Huawei, "Report of email discussion on MBMS user plane details [66#20]," 3GPP TSG-RAN WG2 Meeting #66bis, Jun. 30-Jul. 3, 2009, pp. 1-8, R2-093784.

Nokia Siemens Networks et al., "Primary Component Carrier Selection, Monitoring, and Recovery," 3GPP TSG RAN WG1 #56 Meeting, Feb. 9-13, 2009, 6 pages, R1-090735.

* cited by examiner

APPARATUSES AND METHODS FOR SELECTIVELY RECEIVING MULTIMEDIA BROADCAST/MULTICAST SERVICE IN A WIRELESS COMMUNICATIONS SYSTEM

CROSS REFERENCE TO RELATED APPLICATIONS

This Application claims priority of U.S. Provisional Application No. 61/317,581, filed on Mar. 25, 2010, and the entirety of which is incorporated by reference herein.

BACKGROUND OF THE INVENTION

1. Field of the Invention

The invention generally relates to methods for reception of Multimedia Broadcast/Multicast Service (MBMS) in a wireless communications system and mobile communications devices thereof, and more particularly, to methods for selectively receiving MBMS in multiple connections in a wireless communications system and mobile communications devices thereof.

2. Description of the Related Art

In a typical mobile communications environment, a user equipment (UE) may communicate voice and/or data signals with one or more service networks via cellular stations of the service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, LTE Advanced (LTE-A) technology, and others.

To enhance multimedia functions in the mobile communications environment, a multimedia broadcast multicast service (MBMS) service has been introduced to the LTE specification so that TV, film, information such as free overnight transmission of newspaper in digital form and other media may be broadcast or multicast in the networks. MBMS is a point to multipoint service for data transmission from a data source to multiple users.

To meet requirements associated with growth in network data, carrier aggregation (CA) has been proposed for the LTE-A systems to increase bandwidth for specific users. In CA, two or more Component Carriers (CCs) are aggregated in order to provide wider transmission bandwidths of up to 100 MHz. The CA may be applied to aggregate both contiguous and non-contiguous CCs. It may also be possible for the CA to configure a UE to aggregate a different number of CCs originating from the same evolved Node B (eNB) and possibly, different bandwidths in the uplink (UL) and the downlink (DL). The UE may simultaneously receive or transmit radio frequency (RF) signals via one or multiple CCs depending on its capabilities. A record of a configured set of CCs aggregated for signal and data transmission may be maintained by both the UE and the eNB for keeping information regarding to the configured CCs for the UE.

Generally, the UE capable of CA should receive all of MBMS data transmitted on the CCs configured by the service network. The service network can remove or add a CC in a configured set of CCs of the UE. However, the UEs capable of CA may still need to receive the same MBMS data on the CCs transmitting the MBMS even if the same the MBMS data is transmitted on the CCs, thereby resulting in power consumption.

BRIEF SUMMARY OF THE INVENTION

Accordingly, embodiments of the invention provide mobile communications devices and methods for receiving multimedia broadcast and multicast services (MBMS) in a mobile communications device wirelessly connected to a service network. In one aspect of the invention, a mobile communications device with a wireless module and a controller module is provided. The wireless module performs wireless reception from a service network on a plurality of component carriers, wherein the plurality of component carriers are configured by the service network. The controller module selects a first component carrier from the plurality of component carriers providing the same MBMS content and controls the wireless module to receive the MBMS content on the first component carrier.

In another aspect of the invention, a method for receiving multimedia broadcast and multicast services (MBMS) in a mobile communications device wirelessly connected to a service network is provided. The method comprises the steps of detecting that the MBMS content is being transmitted on a plurality of component carriers from the service network, wherein the plurality of component carriers are configured by the service network, selecting a first component carrier from the plurality of component carriers providing the same MBMS content, and receiving the MBMS content only from the first component carrier.

In yet another aspect of the invention, a mobile communications device with a wireless module and a controller module is provided. The wireless module performs wireless reception from a service network on a plurality of component carriers, wherein the plurality of component carriers are configured by the service network. The controller module receives messages comprising information related to MBMS services on the plurality of component carriers from the service network via the wireless module, obtains the MBMS service IDs and/or MBMS service names corresponding to the MBMS service IDs from the messages, and displays the obtained MBMS service IDs and/or MBMS service names on a display module.

In still another aspect of the invention, a method for receiving multimedia broadcast and multicast services (MBMS) in a mobile communications device wirelessly connected to a service network is provided. The method comprises the steps of receiving messages comprising information related to MBMS services on a plurality of component carriers configured by the service network, obtaining the MBMS service IDs and/or MBMS service names corresponding to the MBMS service IDs from the messages, and displaying the obtained MBMS service IDs and/or MBMS service names on a display module.

Other aspects and features of the present invention will become apparent to those with ordinarily skill in the art upon review of the following descriptions of specific embodiments of apparatuses and methods for receiving MBMS in multiple connections in a wireless communications system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
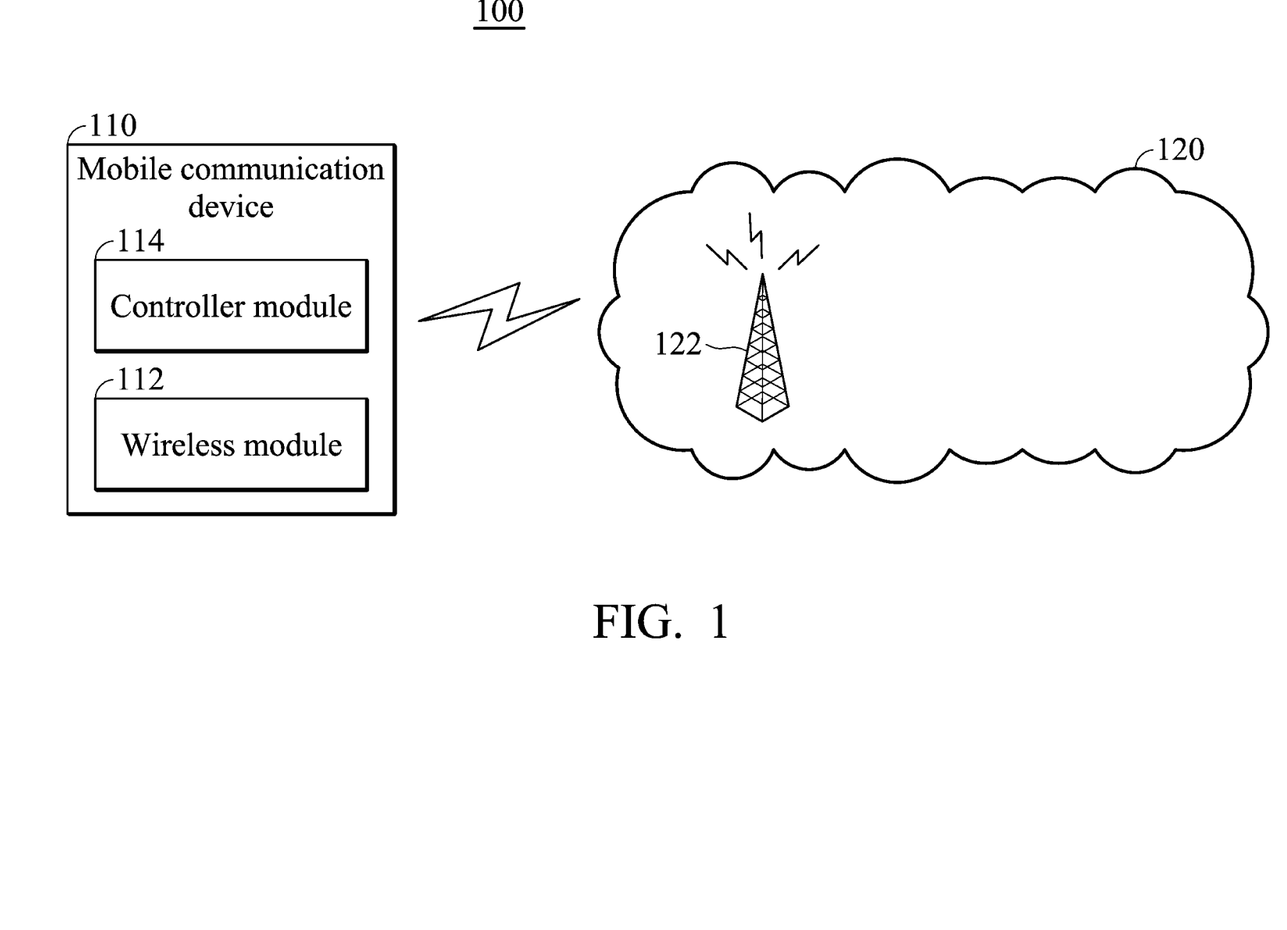
FIG. 1 is a block diagram illustrating a mobile communications system according to an embodiment of the invention.

FIG. 1 is a block diagram illustrating a mobile communications system according to an embodiment of the invention. In the mobile communications system 100, the mobile communications device 110 is wirelessly connected to the cellular station 122 of the service network 120 for obtaining wireless services. Generally, the mobile communications device 110 may be referred to as a User Equipment (UE) and the cellular station 122 may be referred to as a base station, an access station or an evolved Node B (eNB). The mobile communication device 110 comprises a wireless module 112 for performing the functionality of wireless transmissions and receptions to and from the cellular station 122. To further clarify, the wireless module 112 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 110 further comprises a controller module 114 for controlling the operation of the wireless module 112 and other functional components, such as a display unit and/or keypad serving as the MMI (man-machine interface), a storage unit storing the program codes of applications or communication protocols, or others. The service network 120 may also comprise a control node for controlling the operation of the at least one access node. The operation of the service network 120 is in compliance with a communication protocol. In one embodiment, the service network 120 may be a WCDMA network and the mobile communications device 110 may be a UE in compliance with the 24.008 specification and other related specifications of the WCDMA technology; while in another embodiment, the service network 120 may be an LTE network and the mobile communications device 110 may be a UE in compliance with the 3GPP TS 24.301 specification and other related specifications of the LTE technology. Alternatively, the mobile communications device 110 may be a UE in compliance with both of the specifications of the WCDMA and LTE communication protocols, and the invention is not limited thereto.

To be more specific, the controller module 114 controls the wireless module 112 for performing a method for receiving MBMS data from the service network 120 via the cellular station 122.

As previously described, the MBMS service has been introduced in the LTE specification. The MBMS can implement sharing of resources of networks (including a core network and an access network), and can provide a service to as many as possible multimedia users having a same demand, while using minimal resources. An MBMS PTM (Point-to-multipoint) radio bearer configuration procedure may be used by the UE that is interested in receiving one or more MBMS services to configure radio resources. The UE may apply an MBMS radio bearer establishment procedure to start receiving a session of a MBMS service it has an interest in and apply an MRB release procedure to stop receiving a MBMS session.

In the present invention, the UE is an MBMS capable UE, which means that the UE is capable of supporting MBMS service(s). An MBMS capable eNB that is capable of providing MBMS service(s) may belong to a Multimedia Broadcast Single Frequency Network (MBSFN), where multiple eNBs are synchronized to broadcast MBMS data over the air in a single frequency, so that a UE (e.g. the mobile communications device 110) within the coverage of the MBSFN can treat the multi-eNB broadcast transmission in the same way as a single large eNB broadcast transmission, with multipath effects. Prior to acquiring the MBMS from the MBSFN, the UE obtains limited MBMS control information on a Broadcast Control Channel (BCCH) to configure a Multicast Control Channel (MCCH), which carries MBMS control information that the communication device can use to obtain the MBMS in a Multicast Traffic Channel (MTCH). A limited amount of MBMS control information is provided on the BCCH; which primarily concerns the information needed to acquire the MCCH(s), wherein the information is carried by means of a single MBMS specific system information block (SIB): SystemInformationBlockType13. The MBMS control information is broadcasted in the MBSFN periodically using a configurable repetition period defined in the SystemInformationBlockType13. In case the network configures multiple MBSFN areas, the UE acquires the MBMS control information from the MCCHs that are configured to identify if the services it is interested in receiving are ongoing.

Figure 2:
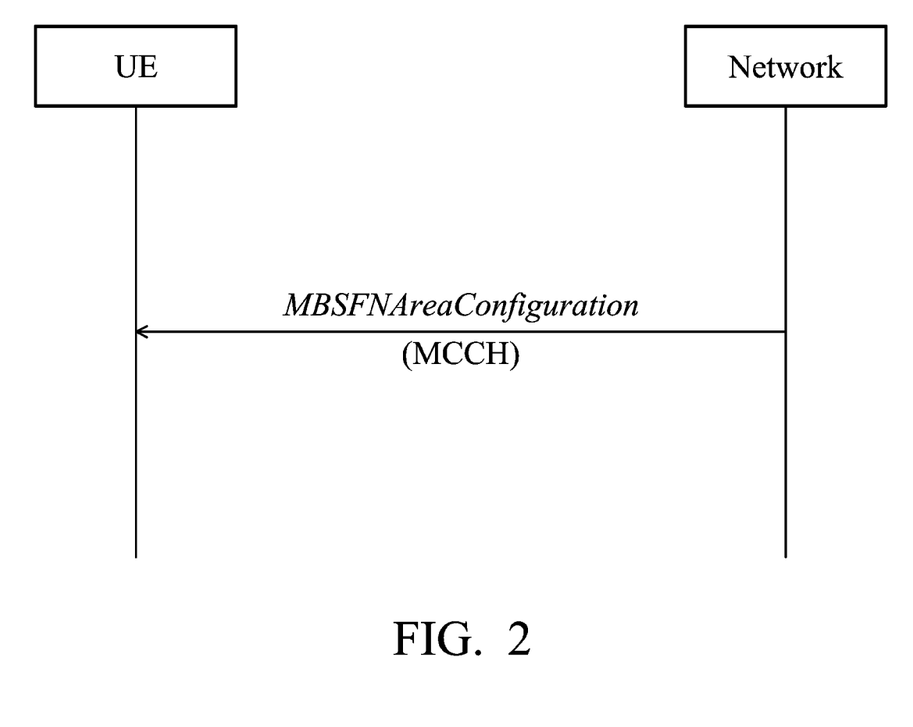
FIG. 2 is a message sequence chart illustrating an MCCH information acquisition procedure according to an embodiment of the invention.

Each eNB periodically broadcasts control information related to an MBMS service available in the eNB itself, using the MCCH. The UE may further perform an MCCH information acquisition procedure to determine the MBMS services available in the eNB and to initiate reception of the services that the UE has joined. The MCCH acquisition procedure may be applied to the UEs supporting the MBMS that are in an idle mode or in a connected mode. FIG. 2 is a message sequence chart illustrating an MCCH information acquisition procedure between the UE and the service network according to an embodiment of the invention. As shown in FIG. 2, in the MCCH information acquisition procedure, the service network transmits a single message, the MBSFNAreaConfiguration message, which indicates the MBMS sessions that are ongoing as well as the (corresponding) radio resource configurations, to the UE on the MCCH. The UE may acquire the MCCH information from the start of each modification period and may perform the MCCH information acquisition procedure upon entering the corresponding MBSFN area (e.g. upon power on, following UE mobility) and upon receiving a notification that the MCCH information has changed. The MBSFNAreaConfiguration message may contain the MBMS control information applicable for an MBSFN area, such as MBMS service identifications (IDs) of the MBMS services in the MBSFN area.

As previously described, it is possible to configure a UE to aggregate a plurality of Component Carriers (CCs) to provided wider transmission bandwidths. When Carrier Aggregation (CA) is configured, the UE only has one Radio Resource Control (RRC) connection with the network. During the RRC connection establishment/re-establishment, one cell may provide the security input to the UE. After the RRC connection is established/re-established, the CC corresponding to that cell may be referred to as the Downlink Primary Component Carrier (DL PCC). There is always one DL PCC and one Uplink PCC (UL PCC) configured per UE in a connected mode. Within the configured set of CCs, other CCs may be referred to as Secondary Component Carriers (SCCs). The RRC Re-establishment may be triggered when the DL PCC experiences Radio Link Failure (RLF).

Conventionally, a UE capable of CA may receive CCs transmitting MBMS. However, if the MBMS content on the CCs are the same, the UE may still turn on a receiver to receive duplicate MBMS content on the CCs such that the UE may waste unnecessary power. In one embodiment, a method for selectively receiving MBMS in a mobile communications device is provided to prevent the duplicated MBMS content from being repeatedly received by the UE.

Figure 3:
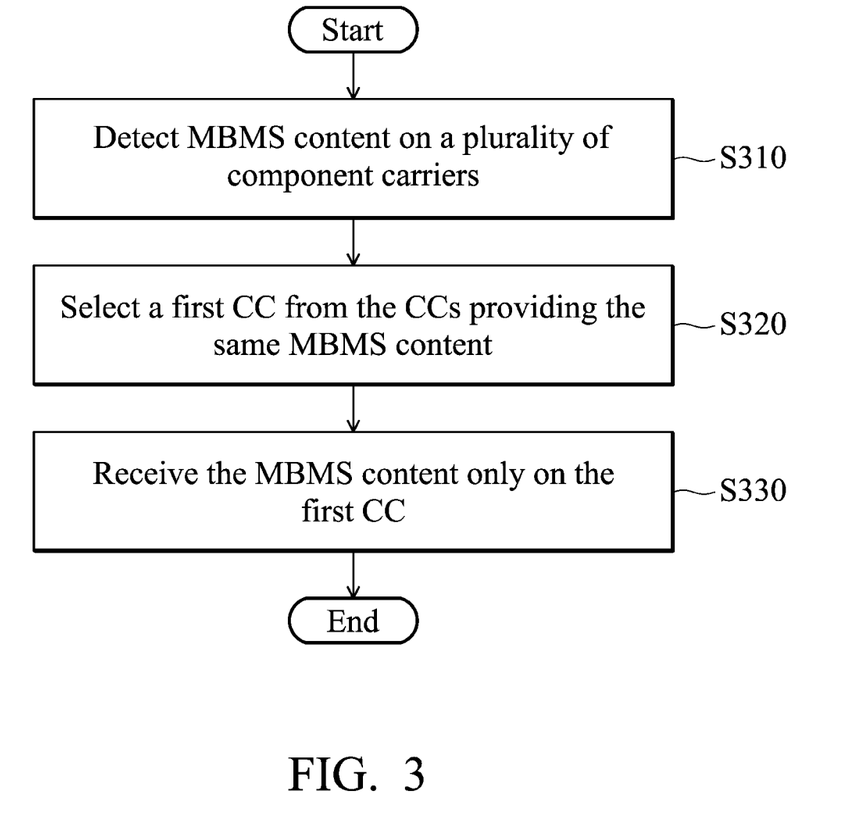
FIG. 3 is a flow chart illustrating a method for receiving MBMS in a plurality of CCs by a mobile communications device according to an embodiment of the invention.

FIG. 3 is a flow chart illustrating a method for receiving MBMS data from a plurality of CCs by a mobile communications device according to an embodiment of the invention. In this embodiment, the mobile communications device is wirelessly connected to a cellular station of the service network in which the component carriers are configured by the service network. The method for receiving MBMS data from a plurality of CCs is suitable for use in the mobile communications device 110 shown in FIG. 1.

The MBMS data may comprise at least one of the MTCH data, MCCH data (e.g. the MBSFNAreaConfiguration message), dynamic scheduling information (DSI), and an MCCH change notification, wherein the MCCH change notification may be received over the physical downlink control channel (PDCCH) by the M-RNTI.

First, the mobile communications device 110 detects MBMS content on a plurality of component carriers, e.g. the CC1, the CC2 and the CC3 as in the aforementioned example (step 310). Note that the MBMS content and any other data/control signaling are transmitted in the form of radio frequency signals and are received via the wireless module 112, which is well known to those skilled and omitted herein.

Thereafter, the mobile communications device 110 may select a first CC from the CCs providing the same MBMS content (step S320). For example, if it is detected that the same MBMS content are transmitted on the CC1, the CC2 and the CC3, the mobile communications device 110 may select any one of the CC1, CC2 and CC3 as the first CC. Then, wireless module 112 of the mobile communications device 110 may receive the MBMS content only on the first CC (step S330). In other words, the mobile communications device 110 does not receive MBMS content on all CCs providing the same MBMS service. For the other CCs transmitting the same MBMS service, the receiver of the mobile communications device 110 can be set as Off, in the MBSFN subframes, for the MBMS service; thereby, saving power of the mobile communications device.

In some embodiments, the first CC is selected from a configured set of CCs utilized for receiving the radio frequency signals from the service network. In some embodiments, after the first CC has been selected, the mobile communications device 110 may further select a second CC providing the MBMS content from the configured set of CCs, stop receiving the MBMS content on the first CC and receive the MBMS content on the second CC according to a network condition. In some embodiment, the first CC may be removed from the configured set of CCs by the service network due to bad signal quality, and when detecting that the first CC has been removed from the configured set of CCs, the controller module 114 may further select a second CC which is providing the MBMS content from the configured set of CCs and receive the MBMS content on the second CC. In another embodiment, even though the first CC is removed from the configured set of CCs by the service network, the mobile communications device 110 may continue receiving the MBMS content on the first CC.

As previously discussed, a UE capable of carrier aggregation (e.g. the mobile communications device 110) may receive CCs transmitting MBMS. An eNB (e.g. the cellular station 122) may remove or add a CC in the configured set of CCs of the UE. The UE may display an MBMS service name to a user for user selection. In some situation, the MBMS service corresponding to the displayed MBMS service name may be transmitted on a CC removed by the eNB such that the UE user may select an unavailable MBMS service for reception. Moreover, when a new MBMS service is transmitted on a CC newly added by the eNB and the UE is not informed, the UE will not display a corresponding MBMS service name to a user for selection and reception. Therefore, the UE will not receive the new MBMS service transmitted on the added CC. Therefore, in one embodiment, a method for processing MBMS data in a mobile communications device is provided to provide an instant MBMS service status for user selection.

Figure 4:
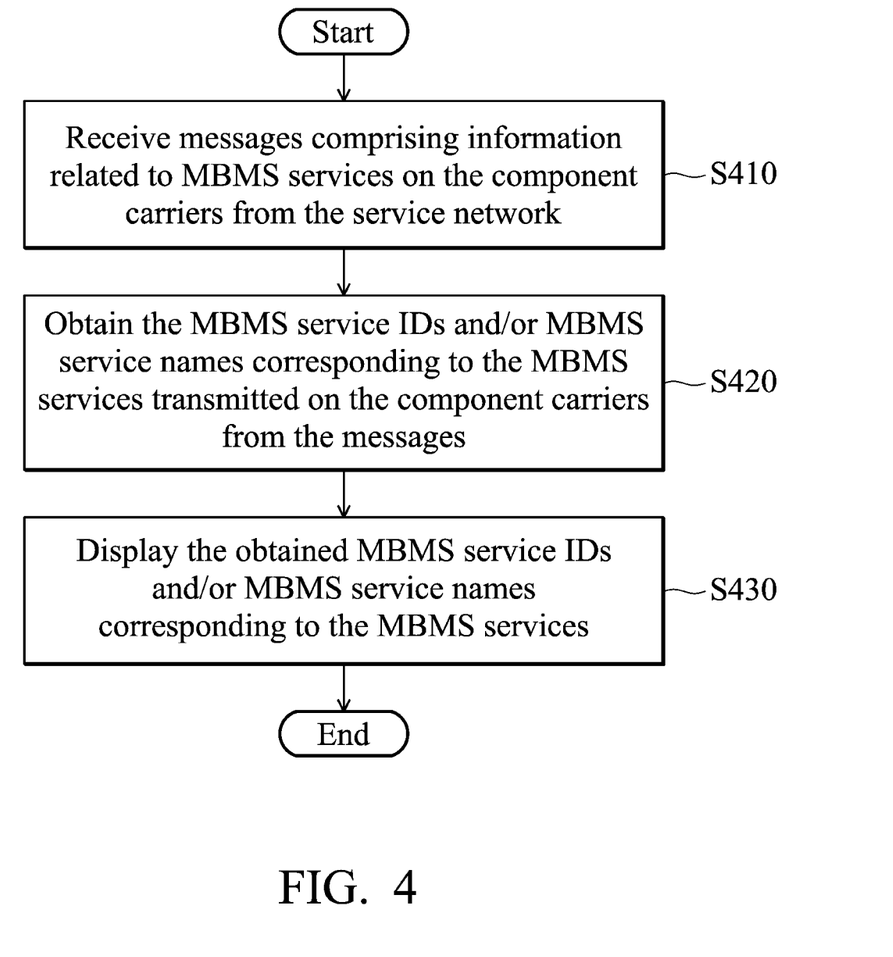
FIG. 4 is a flow chart illustrating flow chart illustrating a method for processing MBMS data received from a plurality of CCs by a mobile communications device according to another embodiment of the invention.

FIG. 4 is a flow chart illustrating a method for processing MBMS data received from a plurality of component carriers by a mobile communications device according to an embodiment of the invention. In this embodiment, the mobile communications device is wirelessly connected to a cellular station of the service network in which the component carriers are configured by the service network. The method for processing MBMS data received from a plurality of component carriers is suitable for use in the mobile communications device 110 shown in FIG. 1.

First, the mobile communications device 110 may receive messages comprising information related to MBMS services on the CCs from the service network 120 via the wireless module 112 (step S410). The CCs may be aggregated in a configured set of CC(s) utilized for receiving the radio frequency signals from the service network 120. The information related to MBMS services on the component carriers included in the messages may at least comprise, for example, MBMS service IDs of the MBMS services that are transmitted and MBMS service names corresponding to the MBMS service IDs. The MBMS data may comprise at least one of the MTCH data, MCCH data (e.g. the MBSFNAreaConfiguration message), dynamic scheduling information (DSI), and an MCCH change notification, wherein the MCCH change notification may be received over the physical downlink control channel (PDCCH) by the M-RNTI. As previously described, for example, the MBMS service IDs of the MBMS services may be carried by an MBSFNAreaConfiguration message, which is acquired by an MCCH information acquisition procedure shown in FIG. 2, from the service network 120. Each MBMS service may have its own MBMS service ID and an MBMS service name corresponding thereto. The controller module 114 may then obtain the MBMS service IDs and/or MBMS service names corresponding to the MBMS service IDs from the messages (step S420).

Thereafter, the controller module 114 may display the obtained MBMS service IDs and/or MBMS service names corresponding to the MBMS service IDs (step S430). For example, the controller module 114 may arrange the obtained MBMS service IDs and/or MBMS service names corresponding to the MBMS service IDs in a list and display the list of the MBMS service IDs and/or MBMS service names corresponding to the MBMS service IDs for user selection when the user would like to know which MBMS services are being transmitted. Then, the user may select any of the displayed MBMS service names in the list to select the MBMS service corresponding to the selected MBMS service name which is to be received.

Note that the list of the MBMS service IDs and/or MBMS service names corresponding to the MBMS service IDs may be changed according to the reconfiguration, addition and removal of the CCs. In one embodiment, when detecting that a first CC has been removed by the service network 120, the controller module 114 may further update the list by removing the MBMS service IDs and/or MBMS service names corresponding to the MBMS services transmitted on the first CC from the list and then display the updated list. Because the MBMS service IDs and/or MBMS service names corresponding to the MBMS services transmitted on the first CC is removed from the list, the user will not be able to select any MBMS service that has been transmitted on a removed CC.

In another embodiment, when a second CC is a newly added CC transmitting MBMS, the controller module 114 may further update the list by obtaining the MBMS service IDs and/or MBMS service names corresponding to the MBMS services transmitted on a second CC and then adding the obtained MBMS service IDs and/or MBMS service names corresponding to the MBMS services to the list, and then display the updated list. It is to be noted that, although the second CC may not be configured in the configured set of the CCs of the mobile communications device 110, the MBMS service IDs and/or MBMS service names corresponding to the MBMS services transmitted on a second CC will still be displayed in the list so that the controller module 114 may further receive the MBMS service transmitted on the second CC in response to a selection of the MBMS service ID and/or MBMS service name corresponding to the MBMS service transmitted on the second CC in the list by a user.

Note that, the mobile communications device 110 may have received system information from the cellular station, which indicates which CC providing the MBMS service. In another embodiment, the mobile communications device may recognize which CCs providing the same MBMS service by a specific message received from the service network. The specific message may be, for example, system information, RRC messages or MBMS dedicated messages, but it is not limited thereto.

In summary, according to the methods for receiving MBMS data in a mobile communications device of the invention, the mobile communications device can receive the MBMS service only on one of the plurality of CCs (i.e. more than one CC) that transmit the same MBMS service and thus reception of duplicate MBMS content on the CCs can be avoided, thereby saving power of the mobile communications device. In addition, according to the method for processing MBMS data in a mobile communications device of the invention, by displaying and updating the MBMS service names of the corresponding MBMS services being transmitted on the CCs, the mobile communications device can update and receive a transmitted MBMS service even if a CC has been added to or removed from the configuration set of CCs, such that the MBMS service can be updated and provided in real time.

The methods may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 114 in FIG. 1, the program code may perform the method for selectively receiving MBMS in a mobile communications device. In addition, the method may be applied to any MBMS capable mobile communications device supporting the WCDMA technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for receiving multimedia broadcast and multicast services (MBMS) in a mobile communications device wirelessly connected to a service network, comprising:
   detecting that a MBMS content is being transmitted on a plurality of component carriers from the service network, wherein the plurality of component carriers are configured by the service network;
   selecting a first component carrier from the plurality of component carriers providing the same MBMS content for a mobile communication device; and
   receiving the MBMS content on the first component carrier by the mobile communication device,
   wherein the MBMS content is still received by the mobile communication device on the first component carrier even when detecting that the first component carrier has been removed from the plurality of component carriers.

2. The method of claim 1, wherein the plurality of component carriers are a configured set of component carriers.

3. The method of claim 1, further comprising selecting a second component carrier providing the MBMS content from the plurality of component carriers and receiving the MBMS content on the second component carrier when detecting that the first component carrier has been removed from the plurality of component carriers.

4. A mobile communications device, comprising:
   a wireless module, for performing wireless reception from a service network on a plurality of component carriers, wherein the plurality of component carriers are configured by the service network; and
   a controller module, for receiving messages comprising information related to multimedia broadcast and multicast services (MBMS) services transmitted on the plurality of component carriers from the service network via the wireless module, obtaining at least one of the MBMS service IDs and MBMS service names corresponding to the MBMS service IDs from the messages, displaying at least one of the obtained MBMS service IDs and MBMS service names on a display module as a list for user selection, and updating the list and then displaying the updated list when detecting that the service network newly adds a first component carrier as a component carrier transmitting MBMS.

5. The mobile communications device of claim 4, wherein the controller module updates the list when detecting that the service network newly adds the first component carrier by adding at least one of the MBMS service IDs and MBMS service names corresponding to the MBMS services transmitted on the first component carrier to the list.

6. A method for processing multimedia broadcast and multicast services (MBMS) data received on a plurality of component carriers in a mobile communications device wirelessly connected to a service network, comprising:
 receiving messages comprising information related to MBMS services transmitted on the plurality of component carriers configured by the service network;
 obtaining at least one of the MBMS service IDs and MBMS service names corresponding to the MBMS services ID from the messages;
 displaying at least one of the obtained MBMS service IDs and MBMS service names as a list for user selection on a display module; and
 updating the list and displaying the updated list when detecting that a first component carrier has been removed from the plurality of component carriers by the service network.

7. The method of claim 6, wherein the step of updating the list when detecting that the first component carrier has been removed comprises updating the list by removing at least one of the MBMS service IDs and MBMS service names corresponding to the MBMS services transmitted on the first component carrier from the list.

8. The mobile communications device of claim 4, wherein the controller module further updates the list and then displays the updated list when detecting that a second component carrier has been removed from the plurality of component carriers by the service network.

9. The mobile communications device of claim 8, wherein the controller module updates the list by removing at least one of the MBMS service IDs and MBMS service names corresponding to the MBMS services transmitted on the second component carrier from the list, when detecting that the second component carrier has been removed from the plurality of component carriers by the service network.

10. The method of claim 6, further comprising:
 updating the list and then displaying the updated list when detecting that the service network newly adds a second component carrier as a component carrier transmitting MBMS.

11. The method of claim 10, wherein updating the list when detecting that the service network newly adds the second component carrier comprises updating the list by adding at least one of the MBMS service IDs and MBMS service names corresponding to the MBMS services transmitted on the second component carrier to the list.

* * * * *